May 13, 1958 L. H. MORIN 2,834,047
APPARATUS FOR MAKING EXTRUDED SPIRAL COAXIAL CABLE
Filed Jan. 15, 1954 2 Sheets-Sheet 1
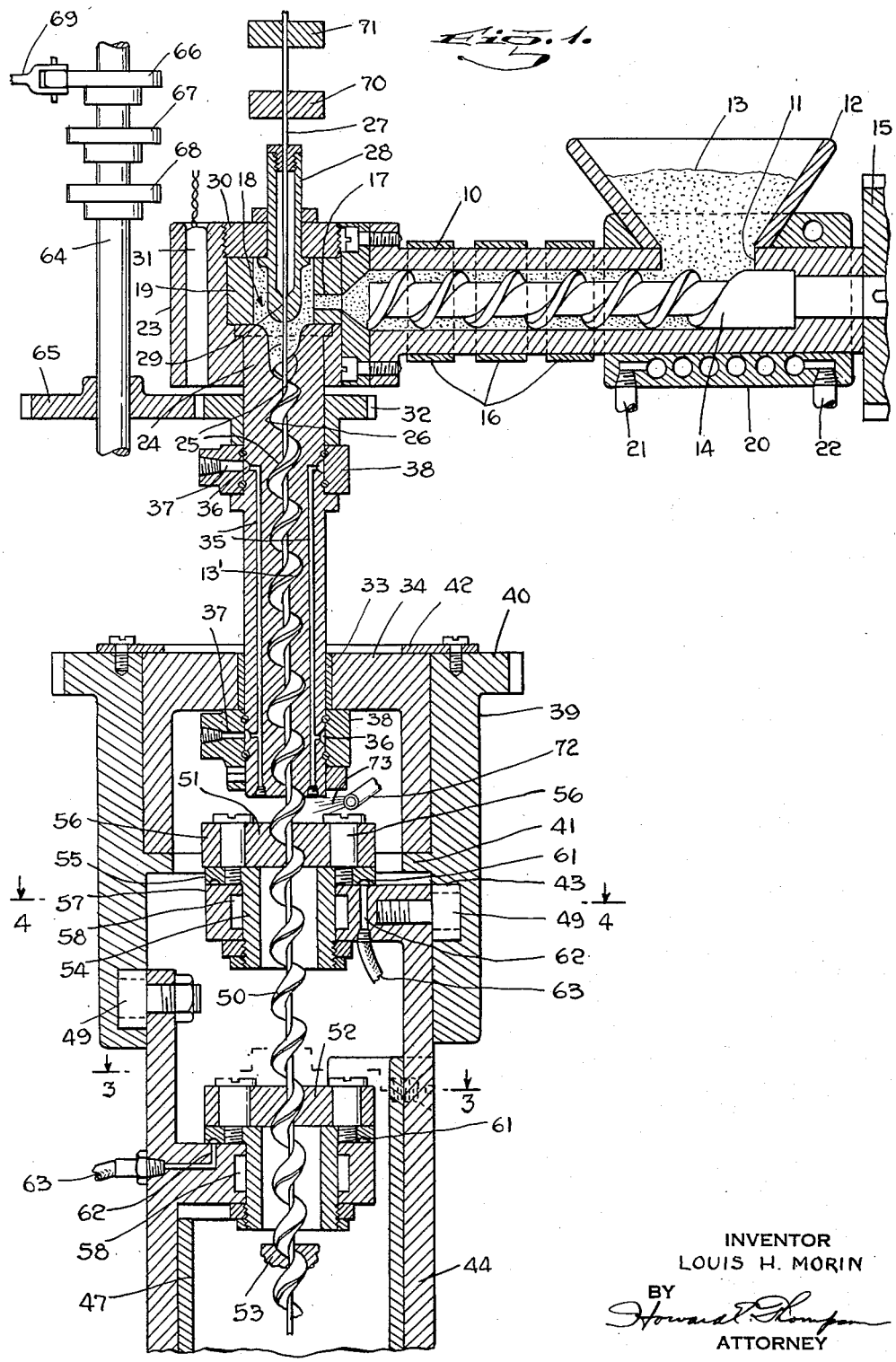
INVENTOR
LOUIS H. MORIN
BY
ATTORNEY

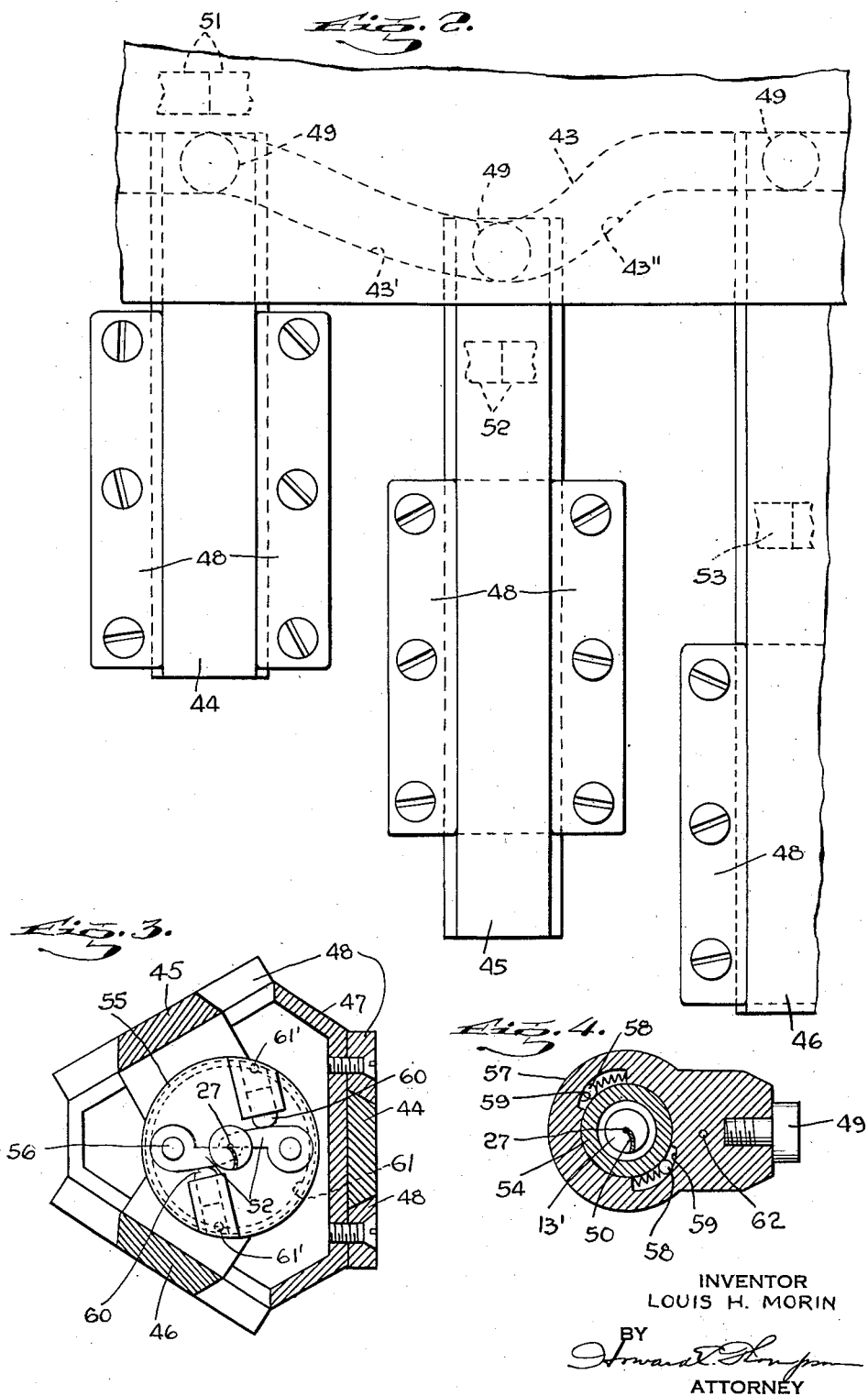

United States Patent Office 2,834,047
Patented May 13, 1958

2,834,047
APPARATUS FOR MAKING EXTRUDED SPIRAL COAXIAL CABLE

Louis H. Morin, Bronx, N. Y.

Application January 15, 1954, Serial No. 404,178

2 Claims. (Cl. 18—13)

This invention deals with the production of spiral coaxial cable. More particularly, the invention deals with a novel apparatus for continuously extruding a spiral plastic around a cable fed in synchronism with the extrusion operation. Still more particularly, the invention deals with an apparatus, wherein the product is fed in a continuous manner through a die through the medium of a plurality of slides, each having a pair of grippers to engage the cable in continuous uninterrupted feed to the cable with the spiral plastic body thereon.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic sectional view, illustrating at least part of the mechanism, parts of the construction being broken away and parts omitted.

Fig. 2 is a diagrammatic extended view, illustrating part of the cam groove and relative positions of the gripper slides therein in performing the continuous uninterrupted feed of the product.

Fig. 3 is a section substantially on the broken line 3—3 of Fig. 1; and

Fig. 4 is a section on the line 4—4 of Fig. 1.

In Fig. 1 of the drawing, I have shown at 10 a cylinder, having an opening 11 at one end portion, with which communicates a hopper 12 for the delivery of plastic grains or the like 13 to the cylinder for feed by a feed screw 14. The feed screw 14 is driven by a suitably operated gear 15 on an end thereof protruding beyond one end of the cylinder. The other end portion of the cylinder has a series of heating elements 16 for plastisizing the plastics, prior to discharge through an aperture, or orifice, 17 into the chamber 18 of a sleeve 19.

In order to keep the cylinder 10 cool at the admission end, a suitable water jacket 20 is employed having an inlet 21 and outlet 22 opening into the various passages of the water jacket 20, as diagrammatically shown in the drawing.

At 23 I have shown a suitable supported bearing at the discharge end of the cylinder 10, in which is supported the die 24, the die having a mould passage 25 opening into the chamber 18 for admission of the extruded plastic material into the spiral cavity 26 of the die in forming a spiral or helical insulator 13' on a cable or conductor 27. The cavity 26 proper will be arranged adjacent the chamber 18 and the remainder of the helical passage in the die can have slight clearance for free passage of the moulded helix therethrough. In other words, formation takes place at the admission or open end of the die and the remainder of the passage simply guides the helix through the die in its cooling and setting stage. The cable or conductor 27 is guided into the chamber 18 and centrally of the cavity 26 by a ferrule 28 having, at its lower end, a portion 29 which fits snugly around the cable so as to centralize the cable with respect to the die cavity, as the cable is fed into and through the die. The ferrule is mounted in connection with a plate 30, which forms part of the chamber 18 and this plate, in conjunction with the sleeve 19, supports the upper end of the die in position in the bearing 23. The chamber 18 is maintained in a heated state by one or more heating elements, one of which is indicated at 31 in the drawing.

The die 24 is rotated through the medium of a gear 32, the lower end portion of the die operating in a bearing 33, constituting part of a suitable support 34. Surrounding the cavity 26, the die 24 is provided with a plurality of elongated apertures 35, through which a cooling medium can be circulated, the apertures 35 opening into annular grooves 36 at the upper and lower extremities thereof. The grooves 36 open into circulating passages 37 of sleeves 38, suitable packings being provided to facilitate rotation of the die in the sleeve in the circulation of the cooling medium through the apertures 35.

Rotatably mounted on the support 34 is a cam 39 having a gear surface 40, by means of which the same can be rotated, the cam having an inwardly projecting flange or shoulder portion 41 for engaging the lower portion of the support; whereas, a retainer plate 42 fixed to the cam engages the upper surface of the support, thus definitely positioning the cam. At 43 is indicated the cam groove which is shown in an extended or flattened-out condition in the diagrammatic showing of Fig. 2 of the drawing in order to clearly illustrate the relative positions of slides 44, 45 and 46 with respect thereto.

In Fig. 3 of the drawing, I have shown at 47 a tubular casing of irregular cross-sectional form, upon which the slides 44, 45 and 46 are retained by pairs of gibs 48. Each of the slides support, at their upper ends, rollers 49 which operate in the cam groove 43, as diagrammatically seen in Fig. 2 of the drawing. The slides are positioned at 120° apart and the cam groove formation is such that a constant uninterrupted feed of the coaxial cable product 50 is provided. The portion 43' of the cam groove 43 represents the downward feed portion of the cam and it will be understood that the roller 49 of one of the slides will enter the upper portion of the groove before the roller of the next adjacent slide has left the lower portion of the groove. In other words, considering Fig. 2 of the drawing, the roller of the slide 44 will be operating in the groove 43' before the roller of the slide 45 has left the groove; thus a continued feed of the coaxial cable 50 will result.

Each slide has an inwardly projecting bearing portion suitably positioned thereon for the support of a pair of grippers, the grippers for the slide 44 being indicated at 51, for the slide 45 at 52, and for the slide 46 at 53. As these grippers are all similarly supported, the brief description of the support of one will apply to all. Each support comprises a sleeve 54 having an annular outwardly extending upper flange portion 55, on which the grippers are pivoted by pins 56.

The sleeves 54 operate in the bearing supports of the slides, one of these bearing supports being indicated in section at 57 in Fig. 4 of the drawing and, in these bearings are arranged spring actuated balls 58 which operate upon cam grooves 59 in checking rotation of the sleeves 54; whereas, in release of the grippers from the cable 50, the sleeves 54 will be permitted to rotate in the supports 57 as and when the rollers 49 of the respective slides move upwardly in the portion 43" of the cam groove.

On each of the flanges 55 are suitably supported air actuated plungers 60 for securely holding the grippers in operative position upon the cable 27, the grippers being so fashioned as to engage the cable intermediate the helical or spiral windings of the plastic body on the cable. Air under pressure is supplied to an annular groove 61 on the lower surface of the flange 55 through a port 62 in the bearing 57 and to the plungers 60 through ports 61'. Air is supplied to the port 62 through an air supply tube 63. It will be apparent, from a consideration of Fig. 1 of the drawing, that the coupling of the tube 63 with the respective slides differs somewhat to suit the structures of the slide, particularly the tube 63 coupled with the slide 44, which differs from the coupling of the tube with the other two slides.

It will also be apparent from a consideration of Fig. 1 of the drawing that the tubular support 47 is so formed, at its upper end, as to provide clearance for operation of the respective slides to clear the bearing portions 57 thereof.

A valve actuating cam shaft 64 is suitably supported at the upper portion of the machine and is rotated through the medium of a gear 65 meshing with the gear 32. On the shaft 64 are three cams 66, 67 and 68 for actuating air valves controlling the supply of air for actuation of the several plungers 60 during the feed operation of the slides 44, 45 and 46. Each cam will actuate a lever for directly operating the respective valves and part of one of the levers engaging the cam 66 is diagrammatically indicated at 69 in Fig. 1, it being understood that other similar levers will be employed in conjunction with the cams 67 and 68.

The cable 27 is delivered from a suitable roll, not shown, and is given a continuous feed motion into the ferrule 28 by a pair of gripper clamps 70 and 71 actuated by suitable means, not shown, in such manner that, when one pair of clamps is about to complete its feed motion of the cable, the other pair of clamps has engaged the cable and started the feed, while the first pair of clamps moves upwardly for an additional grip on the cable and this pair of clamps engages and starts feeding the cable before the second mentioned pair of clamps disengages the cable for its upward free movement to another gripping and feed stage.

With all of the various mechanisms of the machine, a synchronism of drive will be provided so as to initially provide a feed of the plastic material into the chamber 18 sufficient to provide a continuous extruding of plastic material and formation of the same around the cable in the cavity 26 of the die 24 timely with the feed of the cable 27 into the die cavity.

It will also be apparent that the coaxial cable product 50 is also fed from the discharge end of the die constantly and at the same rate of feed as the initial feed of the cable into the die, the latter operation being performed by the three gripper slides employed which successively grip and feed the cable 50 downwardly in a continuously uninterrupted feed operation. During this operation, it will be apparent that the several valves 66, 67 and 68 will be timely actuated to control operation of the grippers 51, 52 and 53 of the slides and to release the grippers during the upward movement of the slides, in which operation the grippers rotate freely around the spiral plastic body and remain free during the idle or rest period at the limit of their upward movement, until such time as they enter the upper ends of the portion 43' of the cam groove 43, at which instant the grippers will be actuated through the plungers 60 in taking up the feed of the cable 50.

It will be noted, from a consideration of Fig. 1, that a cooling water pipe 72 is employed for discharging a jet of cooling water or other medium 73 directly upon the helix product, as it passes from the die and before engagement with the grippers 51.

It will be apparent that the spiral or helix body of plastic material, cast or moulded around the cable, forms the insulator of the resulting coaxial cable, and the contour of the insulating body of plastic material can be modified to suit requirements of the producer. Modifications as to form of the insulator body is controlled by the particular die employed. The only limitation is that the die is so fashioned as to facilitate the production of the resulting coaxial cable in accordance with the continuously uninterrupted feed as heretofore set forth. This continuously feeding apparatus facilitates the production of the resulting product at relatively high speeds as compared with other apparatus using intermittent feeds. Furthermore, my present apparatus facilitates the production of products having high standards with respect to efficiency and accuracy.

Having fully described my invention, what I claim as new and desire to secure by Letters Patent is:

1. In a device for continuously making an insulated conductor, a hopper for granular plastic, a feed screw in a cylinder communicating with the bottom of said hopper, heating elements for said cylinder to plasticize the plastic as it is fed through said cylinder, an elongated die communicating with the discharge end of said cylinder and adapted to receive the plastic discharged therefrom, means for guiding an elongated conductor into through said die along the central axis thereof, means for cooling said die adjacent the discharge end thereof to solidify said plastic, a plurality of grippers adapted to engage the insulated conductor after it emerges from said die, means for operating said grippers successively to continuously withdraw said insulated conductor from said die, and said means comprising a rotating cam adapted to reciprocate said grippers in sequence to continuously feed said conductor through said die.

2. In a device of the class described for continuously making an insulated conductor, a hopper for granular plastic, a feed screw in a cylinder communicating with the bottom of said hopper, heating elements for said cylinder to plasticize the plastic as it is fed through said cylinder, an elongated die communicating with the discharge end of said cylinder and adapted to receive the plastic discharged therefrom, means for guiding an elongated conductor into and through said die along the central axis thereof, means for cooling said die adjacent the discharge end thereof to solidify said plastic, a plurality of grippers adapted to engage the insulated conductor after it emerges from said die, each said gripper comprising jaws adapted to grip said insulated conductor as the gripper moves away from said die and release said conductor as said gripper moves toward said die, means for operating said grippers successively toward and away from said die to continuously withdraw said insulated conductor from said die, and said means comprising cam means adapted to move said grippers sequentially to feed said conductor continuously through said die.

References Cited in the file of this patent

UNITED STATES PATENTS

| | | |
|---|---|---|
| 1,767,692 | Morin | June 24, 1930 |
| 2,446,057 | Morin | July 27, 1948 |
| 2,549,569 | Bradley | Apr. 17, 1951 |
| 2,730,761 | Castellan | Jan. 17, 1956 |

U. S. DEPARTMENT OF COMMERCE
PATENT OFFICE

CERTIFICATE OF CORRECTION

Patent No. 2,834,047      Louis H. Morin      May 13, 1958

It is hereby certified that error appears in the printed specification of the above numbered patent requiring correction and that the said Letters Patent should read as corrected below.

Column 4, line 29, after "into" insert -- and --.

Signed and sealed this 1st day of July 1958.

(SEAL)
Attest:
KARL H. AXLINE
Attesting Officer

ROBERT C. WATSON
Commissioner of Patents